July 11, 1944.   R. LEE   2,353,314
SPEED REGULATING APPARATUS
Filed Dec. 26, 1941   2 Sheets-Sheet 1

INVENTOR
ROYAL LEE
BY Christopher L. Wasl
ATTORNEY

July 11, 1944.                    R. LEE                        2,353,314
                        SPEED REGULATING APPARATUS
                  Filed Dec. 26, 1941          2 Sheets-Sheet 2
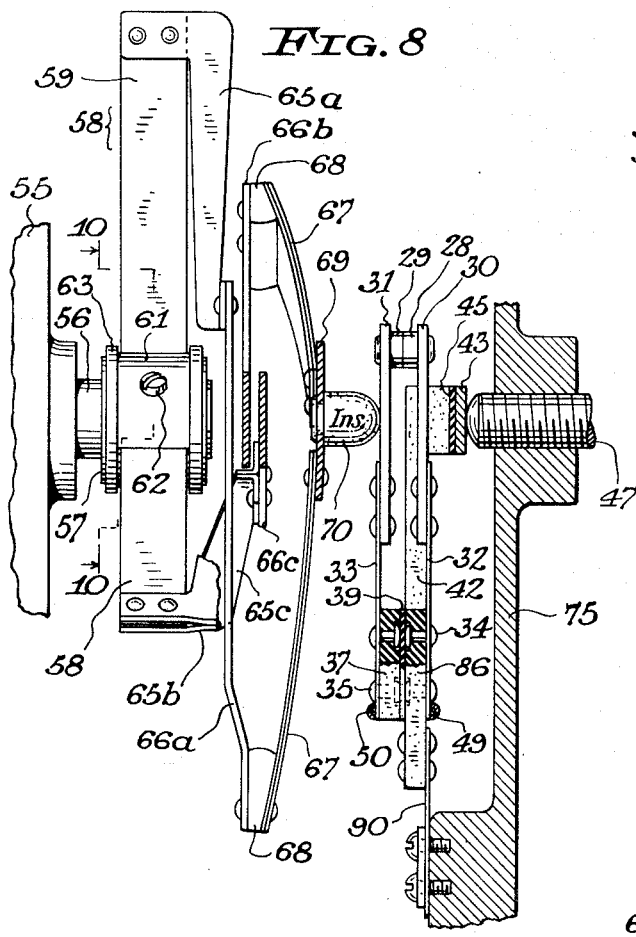
INVENTOR
ROYAL LEE
By Christopher L. Waal
ATTORNEY Patented July 11, 1944

2,353,314

UNITED STATES PATENT OFFICE 2,353,314

SPEED REGULATING APPARATUS

Royal Lee, Milwaukee, Wis., assignor to Lee Engineering Research Corporation, Milwaukee, Wis., a corporation of Wisconsin Application December 26, 1941, Serial No. 424,450

10 Claims. (Cl. 200—80)

The present invention relates to speed regulating apparatus, and more particularly to apparatus of the centrifugally-influenced type adapted for use in the control of electric motors.

An object of the invention is to provide an improved speed regulating apparatus which is quickly responsive to slight changes in the speed of a rotary member and which is capable of regulating the speed within close limits.

Another object is to provide a sensitive speed regulating apparatus which will operate equally well in both directions of rotation of the rotary member.

A further object is to provide a speed regulating apparatus including an improved speed-responsive switch which is so arranged as to permit a high rate of contact vibration and to simplify wiring connections, and which is relatively free from gravitational effects.

A still further object is to provide a speed regulating apparatus which is of simple and durable construction and which is capable of inexpensive manufacture.

The invention further consists in the several features hereinafter described and claimed.

In the accompanying drawings, illustrating certain embodiments of the invention, Fig. 1 is a side elevation of an electric motor provided with speed regulating apparatus of the invention, parts being broken away and parts being shown in section;

Fig. 8 is a view generally similar to Fig. 1, but showing another modified form of speed regulator adapted for use with a reversible motor;

Fig. 9 is a front elevation of the switch actuator of the speed regulator of Fig. 8;

Fig. 10 is a sectional elevation of the switch actuator, taken generally along the line 10—10 of Fig. 8, and Fig. 11 is a sectional elevation of the hub mounting of the switch actuator.

Figure 6:
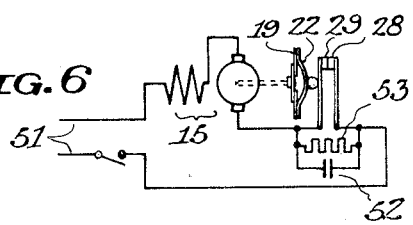
Fig. 6 is a diagrammatic view showing one form of wiring arrangement for the motor speed regulator.
Figure 2:
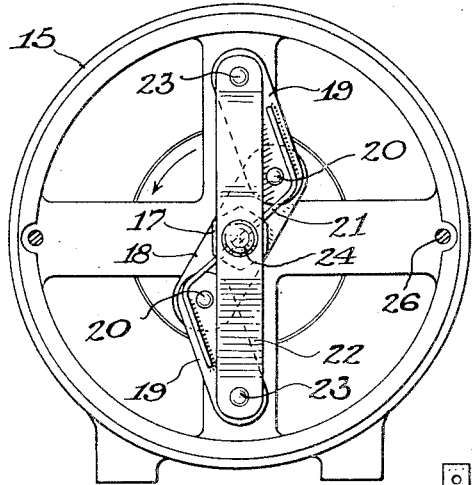
Fig. 2 is an end view of the motor with parts removed and showing a rotatable switch actuator on the motor shaft.
Figure 3:
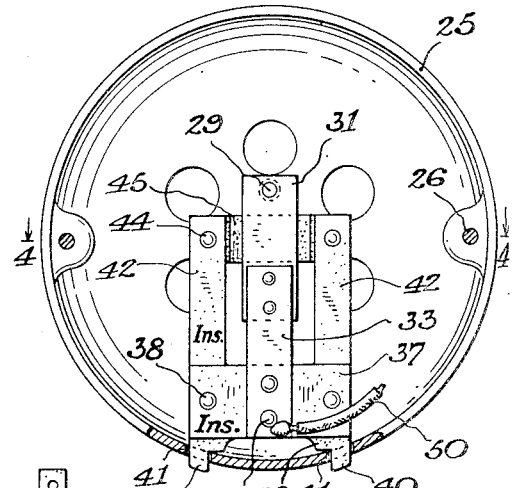
Fig. 3 is an elevation of an end casing of the motor and showing a switch device carried by the casing.
Figure 5:
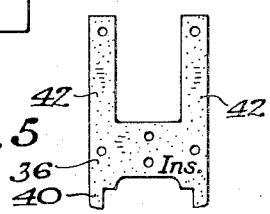
Fig. 5 is a detail elevation of an insulating support for the switch device.

In that form of the invention shown in Figs. 1 to 6, 15 designates a variable-speed electric motor having a rotor shaft 16. By way of example, the motor may be of the series or universal type, as indicated in Fig. 6, although the invention is applicable to other types of motors.

A hub member 17 is rigidly secured to an end of the motor shaft and is provided with flat radial arms 18 extending in opposite directions. Flat weight-forming link bars 19 are pivotally secured to the respective hub arms 18, as by shoulder rivets 20, and project outwardly therefrom, the axes of the rivets being equidistant from, and parallel to, the shaft axis. A bent wire biasing spring 21 is secured at opposite ends to the pivoted bars 19, as by soldering or welding, and urges these bars to the angular position seen in Fig. 2, each bar being angularly displaced in the direction of rotation from a radial position. The link bars are thus resiliently coupled to the motor shaft. A bowed leaf spring 22 is pivotally secured at its outer ends to the outer ends of the link bars 19, as by means of shoulder rivets 23 which are equidistant from, and parallel to, the shaft axis. The center line of the bowed leaf spring lies in the plane of the shaft axis, and the pivot rivets 23 also lie in this plane. The middle portion of the bowed leaf spring is spaced axially from the end of the motor shaft and has secured thereto a button 24 of fibre or other insulating material coaxial with the shaft. The button 24 is adapted to engage a movable element of a circuit-closer device hereinafter described.

The spring-biased link bars 19 form centrifugally-influenced weight members and also form inertia members responsive to changes in motor speed, these bars having a degree of freedom of movement about their axes of rotation and having a component of tangential movement with respect to the motor shaft. The link bars thus provide both radial and tangential inertia action. Under the influence of centrifugal force, the link bars are urged outwardly toward radial positions against the action of the biasing spring, thus tending to straighten the bowed leaf spring 22 and axially displacing the middle portion of the spring toward the adjacent end of the rotating motor shaft. Upon a momentary increase in motor speed the rotative speed of the outer ends of the link bars, by reason of the inertia of these bars, will tend to remain at the former value and thus lag behind the motor speed. As a result, the link bars will swing outwardly against the action of the biasing spring and effect an axial retraction of the bowed leaf spring. In a similar manner a momentary decrease in motor speed will effect an axial advance of the bowed leaf spring.

An apertured cup-shaped end casing 25 is detachably secured to the housing or frame of the motor 15, as by screws 26, the end casing having a central screw-threaded bushing 27. A switch or circuit-closer assembly is detachably mounted in the end casing and comprises a pair of cooperating contacts 28 and 29 secured to the upper ends of respective radiator plates 30 and 31, the lower ends of these plates being riveted or otherwise secured to respective leaf springs 32 and 33, thus forming spring arms for the contacts. At their lower ends the leaf springs 32 and 33 are secured by respective rivets 34 and 35 to respective insulating plates 36 and 37, these plates being secured together as by rivets 38, Fig. 3, and there being an interposed insulating sheet 39 to prevent short-circuiting between the rivets 34 and 35. The insulating plate 36 is fulcrumed at its lower end on the lower portion of the end casing and is provided with guide lugs 40 disposed in openings 41 in the casing. Upwardly projecting fingers 42 are formed at opposite sides of the insulating plate 36 and are spaced laterally from the leaf spring 32 and contact-carrying radiator plate 30. A metal bridge member 43 is secured, as by rivets 44, to the upper ends of the fingers 42 of the insulating plate 36 and is provided with an insulating liner 45. The middle portion of the bridge member is offset so as to allow for angular deflection of the contact-carrying arm 30, 32. A coiled tension spring 46 connects the bridge member 43 and the end wall of the casing member 25 to urge the circuit-closer assembly away from the rotary actuator and hold the lugged insulating plate 36 down in firm fulcrumed engagement with the casing member. An adjusting screw 47 is threaded in the bushing 27 and bears at its inner end on the middle position of the bridge member 43 to adjust the angular position of the circuit-closer assembly. The radiator plates extend across the projected axis of the motor shaft approximately at right angles to this axis, and the insulating button 24 is adapted to bear on the radiator plate 31 to urge the contact 29 against the contact 28. The leaf spring 33 is biased to urge the contact 29 away from the contact 28, so that the retraction of the actuator button will cause the contacts to separate. The adjusting screw 47 may be retained in adjusted position by a lock nut 48. When the adjusting screw 47 is turned outwardly a sufficient distance the spring 46 swings the circuit-closer assembly away from the actuator button 24 and the leaf spring 33 then holds the contact 29 out of engagement with the contact 28. Current is conducted to the circuit-closer contacts by flexible conductors 49 and 50 connected to the lower ends of the respective leaf springs 32 and 33, these conductors avoiding interference with the angular adjustment of the circuit-closer assembly.

The centrifugally actuated circuit-closer can be utilized in various circuits and by way of example is shown in Fig. 6 to be connected in series with the motor 15 which is supplied with current from mains 51. The circuit-closer may be shunted by a suitable spark suppressor, such as a condenser 52, and if desired may be shunted by a resistor 53 which passes part of the motor current. The resistor will also form a path for the discharge current of the condenser.

When the motor is to be operated, the adjusting screw 47 is turned inwardly to effect engagement of the contacts 28 and 29. The motor is started in operation by connecting it to the supply mains to admit current to the motor, the motor current flowing through the then closed contacts. The motor accelerates to a critical speed at which the spring-biased contact 29 separates from the contact 28 incident to the axial retraction of the button 24 carried on the centrifugal actuator, thus reducing the motor current and causing the motor speed to drop slightly. The contacts then re-engage under the pressure of the rotary button 24 which advances axially upon reduction of motor speed, causing the motor speed to again increase slightly, and the cycle of operation is repeated. By the action of the centrifugal actuator the spring-mounted contact 28 vibrates at a high frequency, for example 50 to 500 cycles per second, and the motor speed remains substantially constant. The pivoted rotating inertia members 19 are quickly responsive to slight changes in motor speed, so as to permit rapid axial vibration of the actuator button 24 which controls the vibratory spring-mounted contact 29.

When a higher speed of operation is desired the adjusting screw 47 is turned inwardly, and, conversely, when a lower speed is desired the adjusting screw is turned outwardly. By turning the screw outwardly a sufficient distance the contacts 28 and 29 will remain open, whereupon the motor current will be limited by the resistor 53.

It is desirable to permit a slight sparking between the contacts 28 and 29, as the explosive effect of the sparking has a tendency to separate the contacts and appears to be the force which maintains the vibration of the contact-carrying spring arm 32. This spring arm freely vibrates at or near its natural frequency, and its travel in one direction is limited by the engagement of the contacts. The rate of vibration of the contact 29 is usually much lower than that of the contact 28. Under certain motor load conditions the contact 29 may move quite slowly, or may even remain stationary for a short time, but the contact 28 will nevertheless continue to vibrate.

In a centrifugal motor speed regulator of the vibrating contact type, the closeness of speed regulation depends to a considerable extent on the rate of contact vibration. The speed regulating apparatus of the present invention permits a high rate of contact vibration to be obtained while also providing the advantages of a stationary or non-rotative contact mounting, such type of mounting obviating the use of current-collector rings and brushes for conducting current to the contacts.

Figure 7:
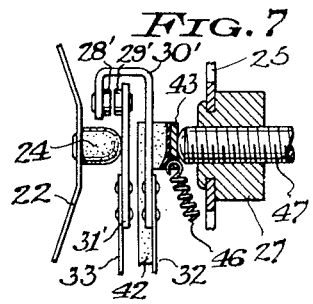
Fig. 7 is a view generally similar to Fig. 1, but showing a modified form of switch device in which the contacts are arranged to close upon an increase of motor speed.

In the modified form of the invention shown in Fig. 7, the contacts 28' and 29' are arranged to close when the motor speed increases, permitting the device to be used in circuits requiring this contact relation. The contacts 28' and 29' are carried on the upper ends of the respective spring-mounted radiator plates 30' and 31', the upper end of the former being hooked to extend over the upper end of the latter. The construction is otherwise similar to that of the device of Fig. 1.

The modified form of speed regulating apparatus shown in Figs. 8 to 11 is arranged to operate in either direction of rotation of the rotary actuator and is adapted for use with an electric motor 55 of the reversible type. The motor has a rotary shaft 56 on which is suitably fastened a hub member 57. Secured to the hub member are radial spring arms 58, three being shown in the present instance and being spaced 120° apart. Each spring arm 58 comprises a pair of leaf springs 59 the width dimension of which extends parallel to the shaft axis. Each leaf spring has a curved intermediate portion 60, Fig. 10, which fits over the convex periphery of the hub member and is clamped thereto by an arcuate clamping plate 61. The several clamping plates are secured to the hub member by respective screws 62 and by interiorly rabbeted end rings 63 which are pressed over the opposite ends of the plates, the end rings being locked in position by end flanges 64, Fig. 11, spun out from the hub member.

The outer ends of the double-leaf spring arms 58 are riveted or otherwise secured to the eared outer ends of respective brackets 65a, 65b and 65c, which extend radially of the hub member. To the flanged inner ends of the brackets are riveted or otherwise secured respective radially extending flat bars 66a, 66b and 66c, the planes of which extend approximately at right angles to the shaft axis. Each bracket forms an extension of the associated bar, and the composite bar thus formed extends diametrically of the shaft and constitutes an inertia member. The bars 66a, 66b and 66c cross the projected axis of the shaft and are axially spaced in the region of the shaft axis as seen in Fig. 8, so as to avoid rubbing contact. To the outer ends of the bars are riveted or otherwise secured the outer ends of curved radially extending leaf spring arms 67, weight-forming blocks 68 being interposed between the attached end portions of the bars and spring arms. If desired each leaf spring arm 67 may have two or more leaves to provide increased flexibility. The inner ends of the leaf spring arms 67 are riveted or otherwise secured to a central disk 69 coaxial with the motor shaft and spaced axially from the end of the shaft, the spring arms and disk forming a three-armed spider. The disk is axially displaceable and carries a central button 70 of fibre or other suitable insulating material. The assembly above described forms a rotary actuator for a switch or circuit-closer assembly.

Figure 1:
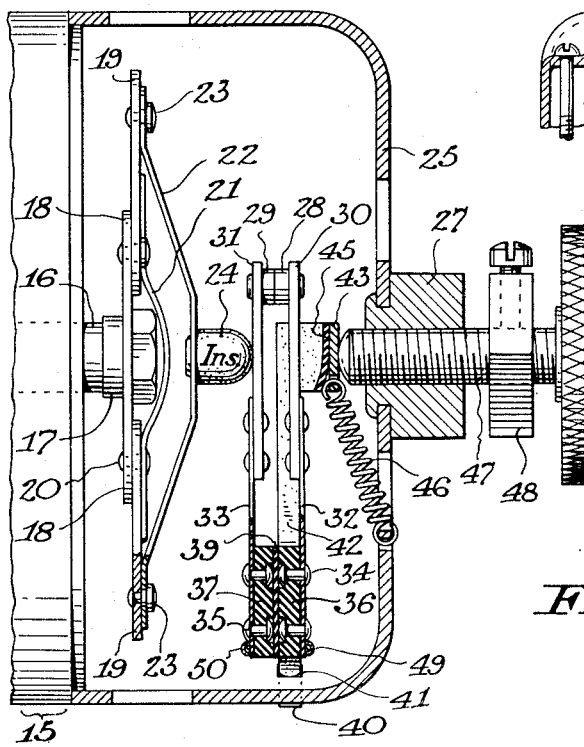
Figure 4:
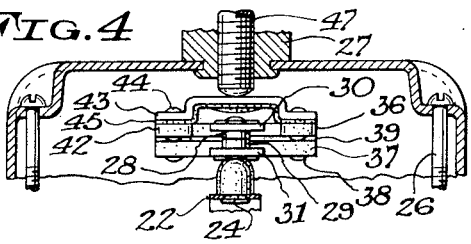
Fig. 4 is a sectional view taken generally on the line 4—4 of Fig. 3.

The circuit-closer assembly shown in Fig. 8 is generally similar to that of Fig. 1, except for the pivotal mounting. A support 75 (which if desired may form a part of the motor housing) has the lower portion of an upright leaf spring 90 clamped thereto, the upper portion of the leaf spring being riveted or otherwise secured to an insulating support 86 of the circuit-closer assembly, the support 86 corresponding to the support 36 of Fig. 1. The leaf spring 90 thus forms a spring hinge for the switch assembly and urges the assembly away from the rotary actuator. An adjusting screw 47 is threaded in the support 75 and bears against the bridge member 43 of the circuit-closer assembly to move this assembly toward the actuator against the urge of the spring hinge 90, so as to bring the radiator plate 31 against the actuator button 70. Instead of attaching the button 70 to the rotary disk 69 it may be attached to the radiator plate 31.

In the operation of the device of Figs. 8 to 11, the rotation of the motor shaft in either direction exerts a centrifugal action on the weighted arms 66a, 66b and 66c, resisted by the deflectable spring arms 58. In some instances the spring arms 67 may also have a resisting action on the weighted arms. By way of example, the rotation is assumed to be counter-clockwise as viewed in Fig. 10. The centrifugal action increases the effective radius of the weight blocks 68 and bows or deflects the spring arms 58, as indicated in Fig. 10. The fanning action of the spring arms also tends to deflect these arms in the same direction. The outward displacement of the weight members 68 exerts a straightening effect on the curved spring arms of the spider 67, 69, and thus axially retracts the button 70 carried on the spider. Upon a momentary increase in motor speed the rotative speed of the outer ends of the weighted bars, by reason of the inertia of these bars, will tend to remain at the former value and thus lag behind the motor speed. As a result, the deflection of the spring arms 58 will increase and effect a further axial retraction of the button 70. In a similar manner, a momentary decrease in motor speed will reduce the deflection of the spring arms 58 and effect an axial advance of the button 70.

When the circuit-closer of Fig. 8 is included in a motor circuit, such as that of Fig. 6, the contacts 28 and 29 will separate upon a slight increase in motor speed and reclose upon a slight decrease in motor speed, as in the device of Fig. 1. Under the control of the rotary actuator of Fig. 8, the spring-mounted contact 28 will vibrate at a high frequency and the motor speed will be regulated within close limits.

Because of the symmetrical mounting of the radial spring arms 58 and attached parts the regulator will operate equally well in both directions of rotation of the motor shaft. The rotary actuator is of such construction that it will be relatively free from gravitational effects.

Each form of speed regulator will operate efficiently at high and low speeds and has a wide range of speed adjustment. The absence of gravitational effects permits the rate of contact operation to be independent of the motor speed, thus avoiding undesired impulses and hunting action.

The centrifugal switch actuator is here shown to be mounted on the rotary shaft of the motor to be regulated, but it will be apparent that this actuator may be mounted on a separate shaft driven by the motor.

Certain specific embodiments of the invention have been shown and described, but it will be understood that changes and modifications may be made therein within the spirit of the invention.

What I claim as new and desire to secure by Letters Patent is:

1. In a speed regulator, the combination of a rotatable member, centrifugally influenced means rotatable with said member and including an inertia element resiliently coupled to said member, said inertia element having a limited freedom of movement in a tangential direction with respect to said member and being responsive to the rate of change in the speed of said member, a shiftable member operatively connected to said inertia element and having a component of axial movement with respect to said rotatable member in response to the movements of said inertia element, and means responsive to the movements of said shiftable member.

2. In a speed regulator, the combination of a rotatable member, a plurality of inertia elements rotatable with said member and resiliently coupled to said member, said inertia elements having different positions about the axis of said rotatable member and being angularly deflectable under the influence of centrifugal force and in response to the rate of change in the speed of said member, a shiftable member operatively connected to said inertia elements and having a component of axial movement with respect to said rotatable member in response to the movements of said inertia elements, and means responsive to the movements of said shiftable member.

3. In a speed regulator, the combination of a rotatable member, a plurality of inertia elements rotatable with said member and resiliently coupled to said member, said inertia elements having different positions about the axis of the rotatable member and being swingable against the restoring action of the resilient coupling, said inertia elements having a limited degree of freedom of movement in a tangential direction with respect to said member and being angularly deflectable under the influence of centrifugal force and in response to the rate of change in the speed of said member, a shiftable member having spring arms connected to said swingable inertia elements for imparting a component of axial movement to said shiftable member in response to the movements of said inertia elements, and means responsive to the movements of said shiftable member.

4. In a speed regulator, the combination of a rotatable member, a plurality of inertia elements pivotally mounted on said member to swing about axes parallel to the axis of rotation, said elements being arranged about the axis of rotation, spring means for biasing said elements, said elements having a degree of freedom of movement about their axes of rotation opposed by the restoring action of said spring means and being responsive to centrifugal force and to the rate of change in the speed of said rotatable member, a shiftable member having spring arms connected to said inertia elements and having a component of axial movement in response to the movements of said elements, and means responsive to the movements of said shiftable member.

5. In a speed regulator, the combination of a rotatable member, a pair of inertia elements pivotally mounted on said member to swing about diametrically opposite axes parallel to the axis of rotation, resilient means for biasing said elements, said elements having a limited freedom of movement about their axes of rotation and being responsive to centrifugal force and to the rate of change in the speed of said rotatable member, an arched spring member having its opposite ends secured to said inertia elements at points spaced from their pivotal axes for imparting a component of axial movement to said spring member in response to the movements of said inertia elements, and means responsive to the axial movements of said spring member.

6. In a speed regulator, the combination of a rotatable member having spring arms deflectable in the plane of rotation, inertia elements secured to the free ends of said arms and having a limited freedom of movement in the plane of rotation opposed by said spring arms, the deflection of said spring arms changing the effective radius of the free ends of said arms from the axis of rotation, said inertia elements being responsive to centrifugal force and to the rate of change in the speed of said rotatable member, a shiftable member operatively connected to said inertia elements and having a component of axial movement with respect to said rotatable member in response to the movements of said inertia elements, and means responsive to the movements of said shiftable member.

7. In a speed regulator, the combination of a rotatable member having outwardly projecting radial spring arms deflectable in the plane of rotation, inertia bars secured at their ends to the free ends of said spring arms and each extending to the opposite side of the axis of rotation, the deflection of said spring arms in either direction from their radial positions shortening the effective radius of said arms from the axis of rotation, said inertia bars having a limited freedom of movement in the plane of rotation and in a longitudinal direction and being responsive to centrifugal force and to the rate of change in the speed of said rotatable member, a shiftable member having spring arms secured to the ends of the inertia bars distant from said first-named spring arms, said shiftable member having a component of axial movement with respect to said rotatable member in response to the movements of said inertia bars, and means to the axial movements of said shiftable member.

8. In a speed regulator, the combination of a rotatable member having an odd number of outwardly projecting radial spring arms arranged about the axis of rotation and deflectable in the plane of rotation, inertia bars secured at their ends to the free ends of said spring arms and each extending to the opposite side of the axis of rotation, the deflection of said spring arms in either direction from the radial position shortening the effective radius of said arms from the axis of rotation, said inertia bars having a limited freedom of movement in the plane of rotation and in a longitudinal direction and being responsive to centrifugal force and to the rate of change in the speed of said rotatable member, a shiftable arched spider having spring arms secured to the ends of the inertia bars distant from said first-named spring arms, said spider having a component of axial movement with respect to said rotatable member in response to the movements of said inertia bars, and means responsive to the axial movements of said spider.

9. In a speed regulator, the combination of a rotatable member, centrifugally influenced means rotatable with said member and including an inertia element having a limited freedom of movement in a tangential direction with respect to said member and responsive to the rate of change in the speed of said member, a shiftable member operatively connected to said inertia element for displacement in response to the movements of said inertia element and having an axially reciprocable part in the region of the axis of said rotatable member, and means responsive to the axial movements of said shiftable member.

10. In a speed regulator, the combination of a rotatable member, speed-responsive inertia means carried by said member and having a limited freedom of movement in a tangential direction with respect to said member, shiftable means rotatable with said member and having a component of axial displacement with respect to said member in response to the movements of said inertia means, and means responsive to the axial movements of said shiftable member.

ROYAL LEE.

CERTIFICATE OF CORRECTION.

Patent No. 2,353,314. July 11, 1944.

ROYAL LEE.

It is hereby certified that error appears in the printed specification of the above numbered patent requiring correction as follows: Page 4, second column, line 24, after the word "means" insert --responsive--; and that the said Letters Patent should be read with this correction therein that the same may conform to the record of the case in the Patent Office.

Signed and sealed this 22nd day of August, A. D. 1944.

(Seal)

Leslie Frazer
Acting Commissioner of Patents.